United States Patent [19]
Armstrong et al.

[11] Patent Number: 6,124,419
[45] Date of Patent: Sep. 26, 2000

[54] RELEASE MODIFIER COMPOSITIONS

[75] Inventors: Stephen Armstrong, Cardiff, United Kingdom; Loretta Ann Jones, Midland, Mich.; David Andrew Rich, Vale of Glamorgan, United Kingdom

[73] Assignees: Dow Corning, Limited, Barry, United Kingdom; Dow Corning Corporation, Midland, Mich.

[21] Appl. No.: 09/134,054

[22] Filed: Aug. 14, 1998

[51] Int. Cl.[7] ....................................... C08G 77/08
[52] U.S. Cl. ................ 528/15; 528/31; 528/32; 524/588; 524/862; 252/182.14
[58] Field of Search .................. 528/15, 31, 32; 524/588, 862; 252/182.14

[56] References Cited

U.S. PATENT DOCUMENTS

| | | | |
|---|---|---|---|
| 3,419,593 | 12/1968 | Willing | 260/448.2 |
| 3,527,659 | 9/1970 | Keil | 117/145 |
| 4,123,664 | 10/1978 | Yamamura et al. | 250/536 |
| 4,399,251 | 8/1983 | Lee | 524/481 |
| 4,526,953 | 7/1985 | Dallavia, Jr. | 528/15 |
| 5,741,439 | 4/1998 | Armstrong et al. | 252/312 |

FOREIGN PATENT DOCUMENTS

| | | |
|---|---|---|
| 0108208 | 8/1983 | European Pat. Off. . |
| 108 208 | 5/1984 | European Pat. Off. . |

*Primary Examiner*—Margaret G. Moore
*Attorney, Agent, or Firm*—Timothy J. Troy

[57] ABSTRACT

This invention relates to a release modifier composition comprising an alkenyl functional polyorganosiloxane and a branched olefin. This invention further relates to the use of the release modifier composition in silicone release coating emulsions and solventless silicone release coating compositions. The silicone release coating compositions of this invention are useful in release pressure sensitive adhesives from a variety of substrates.

31 Claims, No Drawings

RELEASE MODIFIER COMPOSITIONS

FIELD OF THE INVENTION

This invention relates to release modifier compositions and more particularly to release modifier compositions suitable for use in silicone release coating emulsions and in solventless silicone release coating compositions.

BACKGROUND OF THE INVENTION

Silicone release coatings have been known for a long time. They are useful in many applications where a relatively non-adhesive surface is required. The coatings are applied onto substrates and subsequently cured, by, for example thermally initiated or radiation initiated methods depending on the cure chemistry of the system. Silicone release coatings are used, for example, in relation to single sided liners such as in the coating of backing papers for pressure sensitive adhesive labels adapted to temporarily retain the labels without affecting the adhesive properties of the labels themselves and in relation to double sided liners such as interleaving papers for double sided and transfer tapes, which are utilized to ensure the desired unwind characteristics and protection of a double sided self-adhesive tape or adhesive film.

Thermally cured silicone release coating compositions generally contain an alkenylated polyorganosiloxane, a crosslinking agent designed to crosslink the alkenylated polyorganosiloxanes typically by addition polymerization during the cure process, a catalyst to catalyze crosslinking, typically addition reactions, during the cure process, and optionally an inhibitor designed to prevent the commencement of curing below a prerequisite cure temperature.

Compositions containing the above components are generally called premium release coatings compositions. In order to control the level of release force from a coating it has become common practice for a silicone release coating composition to contain an additive, generally known as a release modifier composition. The release modifier composition usually replaces a proportion of the alkenylated polyorganosiloxane in the premium release coating composition. Release modifier compositions are also known as controlled release additives (CRA's) or high release additives (HRA's).

Silicone release coating compositions have been prepared in the form of solutions in organic solvents, oil-in-water emulsions, and in solventless systems. Of these, the emulsion and solventless systems are particularly preferred in the industry. A wide variety of release modifier compositions have been proposed for use in each type of silicone release coating discussed above. Such compositions often include siloxane resins which consist essentially of $R_3SiO_{1/2}$ units (M units) and $SiO_{4/2}$ units (Q units) wherein R is independently selected from the group consisting of alkyl groups and alkenyl groups. In the case of MQ resins used in release modifier compositions, a proportion of the M groups are trialkylsiloxy groups, usually trimethylsiloxy groups, and the remainder of the M groups are alkenyldialkylsiloxy groups. Henceforth in the present application MQ resins of this type will be referred to as alkenyl MQ resins. The alkenyl MQ resins found in release modifier compositions are often vinyl MQ resins such as those described in U.S. Pat. Nos. 4,123,664 and 3,527,659.

European patent specification No. 0108208 describes the use of an MQ resin dispersed in an unsaturated non-volatile organic diluent for example dibutylmaleate, decylvinylether, dodecylvinylether, camphene, isopropenylbenzene or a $C_{16-18}$ α-olefin in a solventless release coating composition. Of the diluents discussed the α-olefins were the most preferred.

U.S. Pat. No. 5,741,439 discloses a silicone release coating emulsion composition comprising an alkenylated silicone resin, an alkenyl polyorganosiloxane, a silicone resin with SiH groups and water. An organic diluent such as dibutylmaleate, decylvinylether, dodecylvinylether, camphene, meta-bis-isopropenylbenzene or a $C_{16-18}$ α-olefin may also be included in the composition. Again the olefins were the preferred diluents, the most preferred of which was 1-octadecene.

U.S. Pat. No. 4,526,953 discloses an addition curable silicone based release coating composition containing "an effective amount of a $C_4$ to $C_{30}$ α-olefin". These olefins are straight chain hydrocarbons with a terminal double bond. However, it is to be noted that the examples provided all relate to $C_{16-18}$ linear α-olefins.

As can be seen from above, a number of silicone release compositions proposed as emulsion or solventless coatings incorporate linear olefins. In each case the linear olefins form part of a release modifier composition. While the use of linear olefins in release modifier compositions has proved to be successful, a number of problems still exist.

Two particular problems are, first, that during curing the olefins presently used tend to partially or completely volatilize at the elevated temperatures encountered and therefore a cloud of "smoke" can often be seen during processing of the modified silicone release coating composition. This volatilization leads to a variation in the composition of the resultant cured coating. Furthermore, the "smoke" is considered to be an undesirable release of volatile organic compounds into the atmosphere. Second, linear olefins such as $C_{4-18}$ α-olefins freeze at moderate temperatures and therefore release modifier compositions incorporating these olefins tend to freeze or at least become very viscous at low temperatures which render the release modifier compositions unsatisfactory in colder climates.

SUMMARY OF THE INVENTION

This invention relates to a release modifier composition comprising an alkenyl functional polyorganosiloxane and a branched olefin.

This invention further relates to the use of the release modifier composition in silicone release coating emulsions and solventless silicone release coating compositions.

It is one object of the present invention to provide improved release modifier compositions.

It is an additional object of the invention to provide release coating compositions comprising the improved release modifier compositions.

The inventors have found that improved release modifier compositions can be provided by use of a particular family of branched olefins.

The inventors have now found that release modifier compositions comprising a particular family of branched olefins overcome these problems whilst maintaining excellent release modification properties.

DETAILED DESCRIPTION OF THE INVENTION

In a first embodiment, this invention relates to a release modifier composition comprising (i) at least one alkenyl functional siloxane and (ii) at least one branched olefin having the formula

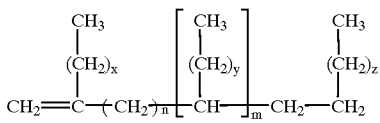

wherein n and m independently have a value of from 0 to 20, x, z and each y is independently have a value of from 1 to 12 with the proviso that the total number of carbon atoms in each olefin is at least 20.

The alkenyl functional siloxane (i) is preferably an alkenyl functional polyorganosiloxane having the formula $MD^1{}_aD^2{}_bT_cM$ wherein M is $R_3SiO_{1/2}$, $D^1$ is $(CH_3)_2SiO_{2/2}$, $D^2$ is $R_2SiO_{2/2}$ and T is $RSiO_{3/2}$ wherein the R is independently selected from the group consisting of alkyl groups, aryl groups, and alkenyl groups. The alkyl groups are exemplified by methyl, ethyl, propyl, butyl, hexyl, octyl, and decyl, the aryl groups are exemplified by phenyl, and the alkenyl groups are exemplified by vinyl, allyl, 3-butenyl, 4-pentenyl, 5-hexenyl, cyclohexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl.

However, at least one R group per polyorganosiloxane must be an alkenyl group, a is an integer, b and c are the same or different and may be 0 or integers. The value of a+b+c, is preferably from about 20 to 750.

The most preferred alkenyl groups are vinyl or hexenyl. Preferably b and/or c are 0. Most preferably both b and c are 0. The value of a+b+c, is most preferably from about 20 to 150. Alkenyl functional polyorganosiloxane polymers with a higher value of a+b+c have typically been found to be too viscous to coat at an appropriate coat weight with respect to solventless systems and for the preparation of oil-in-water emulsions with respect to emulsion systems. While polymers with a value of a+b+c of up to 750 may be used it is preferred to use polymers with a value of a+b+c of 150 or less as these provide coatings with better cure characteristics because of the increased number of alkenyl groups available for cross-linking purposes compared to polymers with higher values of a+b+c. The lower value of a+b+c is determined due to the fact that short chain materials are expensive to buy and make, are insufficiently viscous to coat with respect to solventless systems and steric factors prevent achievement of the desired extent of the crosslinking reaction.

Thus component (i) can be selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane polymers, and hexenyldimethylsiloxy-terminated polydimethylsiloxane polymers. The viscosity of Component (i) can be from 40 to 100,000 millipascal-seconds (mPa·s) at 25° C., preferably is from 40 to 50,000 mPa·s at 25° C., and it is especially preferred that the viscosity of Component (i) is from 400 to 10,000 mpa·s at 25° C. (1 mpa·s=1 centipoise (cP)). It is highly preferred that component (i) is selected from the group consisting of vinyldimethylsiloxy-terminated polydimethylsiloxane polymers and hexenyldimethylsiloxy-terminated polydimethylsiloxane polymers.

The alkenyl functional siloxane (i) may alternatively be an alkenyl functional siloxane resin consisting essentially of at least one $R^1{}_3SiO_{1/2}$ (M) unit and at least one $SiO_{4/2}$ (Q) unit wherein $R^1$ is independently selected from the group consisting of alkyl groups, aryl, groups, and alkenyl groups with the proviso that at least one $R^1$ is an alkenyl group. The alkyl groups, aryl groups, and alkenyl groups are as defined above. The preferred alkyl group is methyl, the preferred aryl group is phenyl, and the preferred alkenyl group is vinyl.

The siloxane resins have a molar ratio of M units to Q units of from 0.6/1 to 4/1. It is preferred that the siloxane resins of the invention have a molar ratio of M to Q units of 0.6/1 to 1.9/1, more preferably from 1.2/1 to 1.6/1, and most preferably 1.4/1. The alkenyl functional siloxane resins of (i) are exemplified by siloxane resins consisting essentially of consisting essentially of: $ViMe_2SiO_{1/2}$ (M) and $SiO_{4/2}$ (Q) units, and consisting essentially of: $Me_3SiO_{1/2}$ (M), $ViMe_2SiO_{1/2}$ (M), and $SiO_{4/2}$ (Q) units, wherein Me denotes methyl, Vi denotes vinyl, and the molar ratio of M to Q units is from 0.6/1 to 1.9/1. Component (i) may also comprise a combination of an alkenyl functional polyorganosiloxane as defined above and an alkenyl functional siloxane resin as defined above.

Component (ii) is the branched olefin having the formula recited above. In the above formula it is preferred that x, y and z independently have a value of from 5 to 8 and most preferably each x, y and z has a value of 7. When n and/or m are greater than 1 they may be either in the form of a block as shown in the above formula or may be randomly distributed along the olefin chain. It is preferred for the m and n groups to alternate in the format shown in accordance with the above formula.

Preferably n and/or m independently have a value of from 0 to 8 and most preferably n and m have the same value, i.e. n=m=0 or n=m=a value of from 1 to 20. It is particularly preferred for n and/or m=0 or 1 and most preferable for n=m=0 or n=m=1.

While it is possible to use a single olefin of the above general formula as component (ii), it has been found that it is particularly advantageous to use a mixture of these olefins in a release modifier composition. One olefin mixture of particular importance comprises (a) a branched olefin where x and z=7 and n and m=0 and (b) a second olefin where x, y and z=7 and n and m=1. Such compounds have the formulae shown below

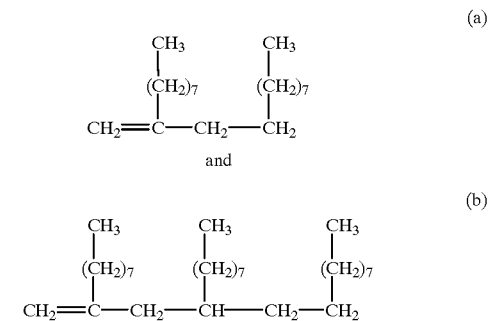

While any mixture of the above two olefins is suitable for the release modifier composition of the invention, it has been found that the best results are obtained when the mixture of (a):(b) is in a weight ratio of from 7:3 to 6:4.

The release modifier composition may further comprise a siloxane resin consisting essentially of: at least one $R^2{}_3SiO_{1/2}$ (M) unit and at least one $SiO_{4/2}$ (Q) unit wherein $R^2$ is an alkyl group. The siloxane resins have a molar ratio of M units to Q units of from $0.6/1$ to $4/1$. It is preferred that the siloxane resins of the invention have a molar ratio of M to Q units of $0.6/1$ to $1.9/1$, more preferably from $1.2/1$ to $1.6/1$, and most preferably $1.4/1$. The alkyl group is as defined above and is preferably methyl. This siloxane resin is preferably a siloxane resin consisting essentially of: $Me_3SiO_{1/2}$ (M) and $SiO_{4/2}$ (Q) units wherein Me denotes methyl, and the molar ratio of M to Q units is from $0.6/1$ to $1.9/1$.

In a most preferred embodiment, the release modifier composition comprises a vinyldimethylsiloxy-terminated polydimethylsiloxane polymer or hexenyldimethylsiloxy-terminated polydimethylsiloxane polymer, one or more of the branched olefins described above, and a siloxane resin consisting essentially of $Me_3SiO_{1/2}$ (M), $ViMe_2SiO_{1/2}$ (M), and $SiO_{4/2}$ (Q) units and/or a siloxane resin consisting essentially of $Me_3SiO_{1/2}$ (M), and $SiO_{4/2}$ (Q) units.

The release modifier composition of the present invention may be utilized in the form of a solventless release modifier composition such as for example a composition comprising a first part comprising a vinyldimethylsiloxy-terminated polydimethylsiloxane polymer and one or more of the branched olefins described above in a weight ratio of from 9:1 to 3:1 and a second part comprising a siloxane resin consisting essentially of $Me_3SiO_{1/2}$ (M), $ViMe_2SiO_{1/2}$ (M), and $SiO_{4/2}$ (Q) units and a siloxane resin consisting essentially of $Me_3SiO_{1/2}$ (M), and $SiO_{4/2}$ (Q) units in a weight ratio of from 20:1 to 1:1. Most preferred is the combination where the weight ratio of the components in the first part is 9:1 and the weight ratio of the components of the second part is 3:1. Furthermore, it is preferred that the weight ratio of the contents of the first part to the second part is from 3:2 to 2:3.

A further alternative solventless release modifier composition in accordance with this invention is provided having a first part comprising a vinyldimethylsiloxy-terminated polydimethylsiloxane polymer and one or more of the branched olefins described above and a second part which is a siloxane resin consisting essentially of $Me_3SiO_{1/2}$ (M), $ViMe_2SiO_{1/2}$ (M), and $SiO_{4/2}$ (Q) units.

A still further solventless release modifier composition in accordance with the present invention comprises a hexenyldimethylsiloxy-terminated polydimethylsiloxane polymer, one or more of the branched olefins, and a siloxane resin consisting essentially of $Me_3SiO_{1/2}$ (M), $ViMe_2SiO_{1/2}$ (M), and $SiO_{4/2}$ (Q) units.

Release modifier compositions are typically sold in the form of controlled release additives which comprise the release modifier composition as described above and optionally an inhibitor, and a platinum group-metal containing catalyst or at least one organohydrogensiloxane which are described hereinbelow.

In a second embodiment, this invention relates to a silicone release coating composition comprising (i) at least one alkenyl functional polyorganosiloxane having at least two silicon-bonded alkenyl groups per molecule, (ii) at least one organohydrogensiloxane having at least two silicon-bonded hydrogen groups per molecule, (iii) a platinum group metal-containing catalyst, and (iv) a release modifier composition comprising (a) an alkenyl functional siloxane and (b) at least one branched olefin having the formula

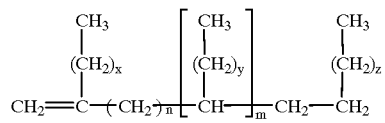

wherein n and m independently have a value of from 0 to 20, x, z and each y is independently have a value of from 1 to 12 with the proviso that the total number of carbon atoms in each olefin is at least 20.

The alkenyl functional polyorganosiloxane polymer of (i) is as described above including preferred embodiments thereof. Preferably the alkenyl functional organopolysiloxane polymer of (i) is selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane polymers, and hexenyldimethylsiloxy-terminated polydimethylsiloxane polymers. Component (i) can also be a combination of two or more of the above described alkenyl functional polyorganosiloxane polymers. The viscosity of Component (i) can be from 40 to 100,000 millipascal-seconds (mPa·s) at 25° C., preferably is from 40 to 50,000 mpa·s at 25° C., and it is especially preferred that the viscosity of Component (i) is from 400 to 10,000 mPa·s at 25° C. (1 mpa·s=1 centipoise (cP)).

Component (ii) is at least one organohydrogensiloxane having at least two silicon-bonded hydrogen atoms per molecule. Component (ii) is preferably an organohydrogensiloxane compound which is free of aliphatic unsaturation and contains two or more silicon atoms linked by divalent radicals, an average of from one to two silicon-bonded monovalent radicals per silicon atom and an average of at least two silicon-bonded hydrogen atoms per compound. Preferably the organohydrogensiloxane (ii) contains an average of at least three silicon-bonded hydrogen atoms such as, for example 3, 5, 10, 20, 40, 70, 100, or more. The organohydrogensiloxane compounds suitable as Component (ii) can linear, branched, resinous, or cyclic, however preferably they are linear.

Component (ii) is exemplified by dimethylhydrogensiloxy-terminated polydimethylsiloxanes, dimethylhydrogensiloxy-terminated polymethylhydrogensiloxanes, dimethylhydrogensiloxy-terminated polydimethylsiloxane-polymethylhydrogensiloxane copolymers, trimethylsiloxy-terminated polydimethylsiloxane-polymethylhydrogensiloxane copolymers, trimethylsiloxy-terminated polymethylhydrogensiloxanes, $PrSi(OSiMe_2H)_3$, cyclic methylhydrogensiloxanes, siloxane resins consisting essentially of $Me_2HSiO_{1/2}$ units and $SiO_2$ units. Component (ii) can also be a combination of two or more of the above described organohydrogensiloxanes.

The viscosity at 25° C. of Component (ii) is generally from 1 to 2000 mpa·s, and is preferably from 5 to 45 mPa·s.

The amount of Components (i) and (ii) that is used in the compositions of this invention is not narrowly limited. The amounts, expressed in terms of the ratio of the number of silicon-bonded hydrogen atoms of Component (ii) to the number of silicon-bonded alkenyl groups of Component (i), should be sufficient to provide a ratio of at least $1/4$ to $100/1$, preferably from $1/2$ to $20/1$, and most preferably from $1/1$ to $3/1$.

Component (iii) is any platinum group metal-containing catalyst which facilitates the reaction of silicon-bonded hydrogen atoms of component (ii) with silicon-bonded alkenyl radicals of component (i). By platinum group it is meant herein ruthenium, rhodium, palladium, osmium, iridium and platinum.

The platinum group metal-containing catalyst is preferably a platinum containing catalyst component since they are the most widely used and available and because they provide a more favorable effect for the compositions of this invention in terms of improved reaction rates. Platinum-containing catalysts can be a compound or complex of a platinum metal.

One type of preferred platinum-containing catalyst in the compositions of this invention is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems.

Preferably component (iii) is selected from the group consisting of chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum black, platinum acetylacetonate, platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, and $RhCl_3(Bu_2S)_3$.

The amount of platinum group metal-containing catalyst component that is used is not narrowly limited as long as there is a sufficient amount to accelerate a room temperature reaction between an organohydrogensiloxane and an alkenyl organopolysiloxane and not so much as to make its action uncontrollable by the use of an inhibitor. The exact necessary amount of this catalyst component will depend on the particular catalyst utilized and is not easily predictable. However, for platinum-containing catalysts the amount can be as low as one part by weight of platinum for every one million parts by weight of components (i)+(ii). However, preferably the catalyst is added at an amount of 10 to 500 parts per one million parts of components (i)+(ii), and it is highly preferred that the amount is at 50 to 250 parts by weight of platinum for every one million parts by weight of (i)+(ii).

Component (iv), the release modifier is as described above including preferred embodiments thereof. Preferably the alkenyl functional siloxane of (iv)(a) is selected from the group consisting of vinyldimethylsiloxy-terminated polydimethylsiloxane polymers and hexenyldimethylsiloxy-terminated polydimethylsiloxane polymers. The viscosity of Component (iv)(a) can be from 40 to 100,000 millipascal-seconds (mPa·s) at 25° C., preferably is from 40 to 50,000 mpa·s at 25° C., and it is especially preferred that the viscosity of Component (i) is from 400 to 10,000 mPa·s at 25° C. (1 mPa·s=1 centipoise (cP)).

Component (iv)(b), the branched olefin, is as described above including preferred embodiments thereof. Preferably x, y and z independently have a value of from 5 to 8 and most preferably each x, y and z has a value of 7.

Preferably n and/or m independently have a value of from 0 to 8 and most preferably n and m have the same value, i.e. n=m=0 or n=m=a value of from 1 to 20. It is particularly preferred for n and/or m=0 or 1 and most preferable for n=m=0 or n=m=1.

It is especially preferred that component (iv)(b) is a mixture comprising (i) a branched olefin where x and z=7 and n and m=0 and (ii) a branched olefin where x, y and z=7 and n and m=1. Preferably the mixture of (iv)(b)(i):(iv)(b)(ii) is in a weight ratio of from 7:3 to 6:4.

Typically from about 10 to 50 wt % of the alkenyl functional polyorganosiloxane in the silicone release coating emulsion composition is replaced by component (iv), the release modifier composition, although significantly more of the alkenyl functional polyorganosiloxane, such as 80 or even 100 wt % can be replaced by the release modifier composition as and when required.

When the silicone release coating of this invention is in emulsion form, the composition further comprises at least one surfactant and water. The surfactant preferably is selected from the group consisting of anionic surfactants, cationic surfactants, and nonionic surfactants. The surfactant component can also be a combination of two or more of the above described surfactants. It is preferred that the surfactant component is a nonionic surfactant. Preferably, the surfactant is polyvinylalcohol having a degree of hydrolysis of at least 92%, and most preferably from 92–98%. Polyvinylalcohol is made by hydrolyzing poly vinylacetate to various degrees. The degree of hydrolysis of a polyvinylalcohol is a number which represents the percentage of pendant acetate groups, originally present in the polyvinylacetate, that have been converted to pendant hydroxyl groups.

The silicone release coating emulsion compositions of this invention generally can comprise any amount of components (i)+(ii)+(iii)+(iv) above such as for example from about 1 to about 75, preferably about 1 to about 50, and most preferably about 10 to about 40 parts by weight for every 50 parts by weight of water. Typically from about 1 to about 5 percent by weight based on the weight of components (i)+(ii)+(iii)+(iv) of surfactant is used. Water forms the remainder of the emulsion, and is preferably clear water, and most preferably distilled and/or deionized water.

The emulsions of this invention can further comprise optional ingredients exemplified by biocides exemplified by TEKTAMER 38 A. D. (available from Calgon Corporation) and viscosity increasing additives exemplified by carboxymethyl cellulose, hydroxyethyl cellulose, and sodium alginates.

The silicone release coating emulsion compositions of this invention can be prepared by adding at least one surfactant and water to components (i)–(iv). The order of mixing the components is not critical however it is preferred to mix components (i), (ii), (iv), at least one surfactant, water, and any optional ingredients together, and then add component (iii) to this mixture just before the release coating emulsion is used. Generally, the emulsions are prepared by reacting a mixture comprising components (i)–(iv), surfactants, and water, and any optional ingredients. "Reacting" for the purposes of this invention denotes simply mixing components (i)–(iv), and any optional components at room temperature (about 25° C.) or heating a mixture of components (i)–(iv) and any optional components at temperatures above room temperature. It is preferred to simply mix the components. The crude emulsion may then be mixed using any of the known homogenizer machines to form an emulsion having the desired particle size and distribution.

The silicone release coating compositions and the silicone release coating emulsion compositions of this invention can further comprise an inhibitor. The inhibitor is utilized to prevent the cure of the coating from occurring below a predetermined temperature. While an inhibitor is not essential to the functioning of the coating itself it is to be understood that without the presence of an inhibitor the catalyst may initiate/catalyze the cure of the silicone release coating composition at ambient temperature.

The inhibitor can be any material that is known to be, or can be, used to inhibit the catalytic activity of platinum group metal-containing catalysts. By the term "inhibitor" it is meant herein a material that retards the room temperature curing of a curable mixture of an alkenyl functional polyorganosiloxane, an organohydrogensiloxane and a platinum catalyst, when incorporated therein in small amounts, such as less than 10 parts by weight of the composition, without preventing the elevated temperature curing of the mixture. Examples of suitable inhibitors include ethylenically or aromatically unsaturated amides, acetylenic compounds including acetylenic alcohols and silylated acetylenic alcohols, ethylenically unsaturated isocyanates, olefinic siloxanes, unsaturated hydrocarbon diesters, conjugated ene-ynes, olefinic cyclosiloxanes, hydroperoxides, nitriles, and diaziridines.

Preferred inhibitors are exemplified by acetylenic alcohols exemplified by 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-oxy)silane, methylvinylbis(3-methyl-1-butyn-3-oxy) silane, and ((1,1-dimethyl-2-propynyl)oxy)trimethylsilane, unsaturated carboxylic esters exemplified by diallyl maleate, dimethyl maleate, diethyl fumarate, diallyl fumarate, and bis(2-methoxy-1-methylethyl) maleate, conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such as 1,3,5,7-tetramethyl-1,3,5,7-tetravinylcyclotetrasiloxane, a mixture comprising a conjugated ene-yne and a vinylcyclosiloxane, a mixture comprising a vinylcyclosiloxane and an acetylenic alcohol, and a mixture comprising an unsaturated carboxylic ester and an alcohol exemplified by benzyl alcohol and 1-octanol.

The amount of inhibitor to be used in the silicone release coating compositions of this invention is not critical and can be any amount that will retard the reaction between Components (i) and (ii) initiated by the presence of catalyst (iii) while not preventing this reaction at elevated temperatures. No specific amount of inhibitor can be suggested to obtain a specified pot life at room temperature since the desired amount of any particular inhibitor will depend on the type of platinum group metal-containing catalyst (iii) which is used, the nature and amounts of ingredients (i), (ii), and (iv) and the presence or absence of optional ingredients. The affinity of a particular inhibitor for platinum also has to be considered when selecting a molar ratio of inhibitor to platinum and can be determined by routine experimentation. However, it is preferred that from 0.1 to 10 parts by weight of inhibitor be used, and it is highly preferred that from 0.5 to 5 parts by weight of inhibitor be employed per 100 parts by weight of Component (i).

The silicone release coating compositions of this invention can be prepared by reacting a mixture comprising (i)–(iv) and any optional ingredients in any order using any suitable mixing means such as a spatula, a drum roller, a mechanical stirrer, a three-roll mill, a sigma blade mixer, a bread dough mixer, and a two-roll mill. "Reacting" for the purposes of this invention denotes simply mixing components (i)–(iv), and any optional components at room temperature (about 25° C.) or heating a mixture of components (i)–(iv) and any optional components at temperatures above room temperature. It is preferred to simply mix the components. The order of mixing the components is not critical however it is preferred to mix components (i), (ii), (iv), and any optional ingredients together, and then add component (iii) to this mixture just before the release coating composition is used.

In a third embodiment, this invention relates to a method of making an article of manufacture comprising (I) applying a silicone release coating composition to the surface of a substrate wherein the silicone release coating composition comprises: (i) at least one alkenyl functional polyorganosiloxane having at least two silicon-bonded alkenyl groups per molecule, (ii) at least one organohydrogensiloxane having at least two silicon-bonded hydrogen groups per molecule, (iii) a platinum group metal-containing catalyst, and (iv) a release modifier composition comprising (a) an alkenyl functional siloxane and (b) at least one branched olefin having the formula

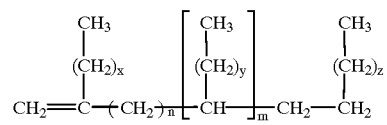

wherein n and m independently have a value of from 0 to 20, x, z and each y is independently have a value of from 1 to 12 with the proviso that the total number of carbon atoms in each olefin is at least 20.

The silicone release coating composition can further comprise surfactants and water when it is desired to have the release coating in the form of an emulsion. The silicone release coating composition and silicone release coating emulsion can further comprise an inhibitor and any of the optional ingredients recited above. Components (i)–(iv) and the optional ingredients are as described above, including amounts and preferred embodiments thereof.

The method of this invention can further comprise (II) exposing the product of (I) to heat in an amount sufficient to cure the silicone release coating composition. The method of this invention can also further comprise (III) applying an adhesive to the product of (I) or the product of (II).

Preferably, the substrate is a flexible sheet material such as paper, polyolefin film, polyolefin-coated paper, or foil. Other suitable solid substrates that can be coated by the method of this invention include other cellulosic materials such as wood, cardboard and cotton, metallic materials such as aluminum, copper, steel and silver, siliceous materials such as glass and stone, and synthetic polymer materials such as polyolefins, polyamides, polyesters and polyacrylates. As to the form of the solid substrate, it can be substantially sheet-like, such as a peelable release liner for pressure sensitive adhesive, a fabric or a foil, or substantially three-dimensional in form.

The application of the silicone release coating composition to the substrate can be accomplished by any suitable manner known in the art, such as by spreading, brushing, extruding, spraying, gravure, kiss-roll and air-knife. By heat it is meant infrared radiation, hot-air, or microwave radiation.

After the curable silicone release coating composition has been coated onto a substrate it is heated to cure the liquid coating and to adhere it to the substrate.

In a preferred embodiment of the method of this invention, a flexible sheet material, such as paper, metal foil or tapestock, is coated with a thin coating of the liquid curable silicone release coating composition, preferably in a continuous manner and the thus-coated material is then heated to rapidly cure the coating, to provide a sheetlike material bearing on at least one surface thereof an adhesive-releasing coating. The adhesive-releasing coating is subsequently brought into contact with a pressure sensitive adhesive, to form an article having a peelable, i.e. releasable, adhesive/coating interface.

Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide-or platinum-curable polydiorganosiloxane-based adhesives.

The method of this invention is also applicable to adhesive materials, other than pressure sensitive adhesives. Examples of said adhesive materials include foods, asphalt and gum polymers.

As a comparison to the silicone based release compositions of the present invention, the inventors also prepared a number of samples outside the scope of the invention. For example it was noted that prior art release modifier compositions often comprise a linear $C_{16-18}$ α-olefin together with an alkenyl, usually vinyl, terminated MQ resin. The inventors have found that a minor improvement to the properties of the release modifier composition occurs with the introduction of a trimethyl capped polysiloxane resin to the prior art composition mentioned above. However, this improvement is relatively small compared with replacing the $C_{16-18}$ α-olefins with branched olefins as described in the present invention.

The inventors have also determined that, while the preparation of a copolymer of the crosslinking agent and one or more of the branched olefins may be used to crosslink the alkenylated polysiloxane polymer(s), such a release modifier does not provide advantageous release modification and therefore it is believed that the branched olefins as described in the release modifier composition of the present invention must be present in the release modifier composition in a form which is not a copolymer.

EXAMPLES

The following examples illustrate the present invention by comparing the properties of release modifiers compositions of the present invention with known release modifier compositions.

Release modifier compositions were then prepared by mixing 68 weight percent (wt %) of a siloxane resin consisting essentially of $Me_3SiO_{1/2}$ (M), $ViMe_2SiO_{1/2}$ (M), and $SiO_{4/2}$ (Q) units, the molar ratio of M to Q units is from 0.7/1 and the siloxane resin contains 1.75 to 2.3 wt % vinyl, 4.8 wt % of a vinyldimethylsiloxy-terminated polydimethylsiloxane having a viscosity of about 9000 mpa·s (millipascal-seconds) at 25° C., and 27.2 wt % of olefin. The xylene was then removed by stripping under vacuum. Several tests were carried out utilizing these release modifier compositions whereby the olefin was either a branched olefin mixture containing

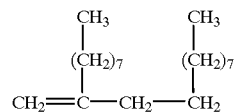

(a)

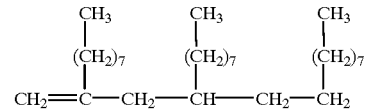

(b)

and the mixture of (a):(b) was in a weight ratio of from 7:3 to 6:4 or 1-octadecene (a $C_{18}$ α-olefin). All other constituents of the release modifier compositions were identical. In all subsequent examples the release modifier composition prepared above containing the branched olefin mixture will be referred to as release modifier composition X and the comparative release modifier composition incorporating an identical wt % of 1-octadecene will referred to as release modifier composition Y.

Example 1

The variation of viscosity with temperature of each of the release modifier compositions X and Y was determined by first measuring the viscosity at a standard temperature, 23° C. and 50% Relative Humidity using a Brookfield viscometer. The temperature was then gradually reduced and viscosity values were taken at 10° C. and 0° C. The results appear in Table 1

TABLE 1

| TEMP | Release Modifier | |
| --- | --- | --- |
| ° C. | Y | X |
| 0 | SOLID | 15686 |
| 10 | SOLID | 7843 |
| 20 | 588 | 3137 |

All viscosity measurements in Table 1 are in mpa·s.

Hence it will be appreciated that release modifier composition X which contained the branched olefin mixture was still in a liquid form at a temperature of 0° C. whereas composition Y containing 1-octadecene was found to be a solid at 10° C.

Example 2

Release modifier compositions X and Y were compared with respect to their smoking properties by placing the samples of each release modifier composition in an oven, maintained at a constant temperature of 200° C. It is to be noted that this temperature is significantly in excess of normal curing temperatures used with silicone release coating compositions which are usually from 120 to 150° C. It was found that smoke was visible less than 90 seconds after introducing the sample of release modifier composition Y into the oven but it took over 240 seconds before any smoking was visible from the sample of release modifier composition X. This demonstrates that there is a significant reduction in smoking when the branched olefin mixture is used in a release modifier composition instead of 1-octadecene.

Example 3

Samples of release modifier compositions X and Y were prepared as before with the addition of small amounts of an inhibitor and a catalyst. The resultant release modifier compositions $X^1$ and $Y^1$, contained 97.08 weight % of release modifier compositions X and Y, respectively, with 0.97 wt % of bis(2-methoxy-1-methylethyl) maleate and 1.95 wt % a platinum catalyst solution containing a complex of chloroplatinic acid and divinyltetramethyldisiloxane diluted in vinyldimethylsiloxy-terminated polydimethylsiloxane having a viscosity of 450 mpa·s to provide 1.5 wt % platinum prepared according to Example 1 of U.S. Pat. No. 3,419,593 to Willing (hereinafter referred to as "platinum catalyst").

Release modifier compositions $X^1$ and $Y^1$ were then mixed into identical silicone release compositions to form solventless release coating compositions. In addition to the release modifier compositions, the solventless release coating compositions contained a vinyldimethylsiloxy-terminated polydimethylsiloxane having a viscosity of about 9000 mPa·s (millipascal-seconds) at 25° C., and a sufficient amount of trimethylsiloxy-terminated methylhydrogenpolysiloxane and trimethylsiloxy-terminated polydimethylsiloxane-polymethylhydrogensiloxane copolymer to provide a ratio of the total number of silicon-bonded hydrogen atoms to the total number of silicon-bonded alkenyl groups of 1.15:1 in the solventless release coating composition.

A number of solventless release coating compositions were prepared wherein the relevant release modifier composition replaced a proportion of the vinyldimethylsiloxy-terminated polydimethylsiloxane polymer, indicated in the following table, in which the wt % of release modifier present is varied.

The solventless release coating compositions were applied on to a clay coated paper (Cham Tenero CT-688) using a Euclid® laboratory coater to give a coating of 1 g/m². Papers coated with the solventless release coating composition were subsequently placed in an oven at 120° C. for 20 seconds to cure the solventless release coating composition. The coated papers were then aged for 7 days at 23° C. and 50% relative humidity. Laminates were then prepared by applying adhesive coated high gloss white facestock (from Avery Dennison Corporation) onto the cured coatings. The laminates were aged at an elevated temperature overnight to ensure intimate wetting of adhesive on the silicone coating.

High speed release performance (g/50 mm) was then determined by delamination of the tapes using an Instrumentors Inc. ZPE-1000 High Rate Peel Tester at a variety of speeds. A further comparison was made wherein the coating was the premium release coating. The results of all of the tests are denoted in Table 2 below.

The delamination of the adhesive coated high gloss white facestock from coatings containing release modifier $X^1$ gave significantly higher values than the comparative samples.

TABLE 2

| % Release Modifier | MODIFIER | DELAMINATION SPEED (m/min) | | | | |
|---|---|---|---|---|---|---|
| | | 0.3 | 10.0 | 20.0 | 100.0 | 200.0 |
| | | performance (g/50 mm) | | | | |
| 0 | None present | 6 | 20 | 28 | 62 | 73 |
| 40 | $Y^1$ | 16 | 40 | 53 | 165 | 229 |
| 40 | $X^1$ | 58 | 107 | 156 | 327 | 355 |

It is to be understood that the higher results provided by $X^1$ are improvements over the comparative prior art example using $Y^1$ as these higher values mean that the compositions in accordance with this invention may be used to produce a wider range of end products and because a reduced amount of the new release modifier will be required in the release coating composition to achieve any given level of release performance.

Example 4

Low speed Release performance delamination tests were also carried out using the same coating compositions as in the previous case using two alternative test tapes. The tapes were TESA® 4651 which uses a rubber adhesive and TESA® 7475 which uses an acrylic adhesive. In these tests delamination was undertaken using a Lloyd® Instruments L500 Tensometer at a delamination speed of 0.3 m/min. In each of the two sets of tests coating compositions containing release modifier composition $X^1$ gave significantly higher results than the comparative coating compositions.

In these cases two different criteria were used to test the performance after different set periods of time. Immediate/20 hours means that the relevant coating was laminated immediately after curing and then delamination was undertaken after conditioning the laminate for 20 hours at 23° C. and 50% relative humidity. Similarly 7 Days/20 hours means that lamination was undertaken 7 days after curing and delamination was carried out after conditioning the laminate for 20 hours at 23° C. and 50% relative humidity. In both cases the coating compositions containing release modifier composition $X^1$ provided higher results. The results are shown in Table 3 below.

TABLE 3

| Tape | Aging | 0% RM | 40% RM $Y^1$ | 40% RM $X^1$ |
|---|---|---|---|---|
| | | Release (g/25 mm) | | |
| 4651 | Immediate/20 hours | 6.5 | 14.3 | 20.1 |
| | 7 Days/20 hours | 4.7 | 13.4 | 29.2 |
| 7475 | Immediate/20 hours | 9.3 | 51.0 | 196.7 |
| | 7 days/20 hours | 5.6 | 10.2 | 20.3 |

Example 5

In the following example, the branched olefin mixture was used as the sole component of the release modifier in a composition with containing vinyldimethylsiloxy-terminated polydimethylsiloxane polymer, a trimethylsiloxy-terminated polydimethylsiloxane-polymethylhydrogensiloxane copolymer, platinum catalyst, and bis(2-methoxy-1-methylethyl) maleate. In this example the only compositional variations were the replacement of polymer by the olefin mixture. Table 4 below relates to the amount of the branched olefin mixture used to replace the equivalent amount of polymer per 100 g of the polymer.

In this instance the two TESA tapes used for lamination purposes were the 7475 acrylic based tape and 7476 rubber based tape. The release coating compositions were coated onto 87 g super calendered Kraft paper (Nicolet) and the pull speed utilized was 400 inches per minute. The coatings were laminated with the tapes immediately after curing and the laminates were then aged at 23° C. and 50% Relative Humidity for seven days before delamination. The results are shown in Table 4 below.

TABLE 4

| Amount of branched olefin mixture (g per 100 g of polymer) | 7475 Tape (g per inch) | 7476 Tape |
| --- | --- | --- |
| 0.0 | 37.5 | 16.3 |
| 0.7 | 46.6 | 35.1 |
| 2.5 | 70.1 | 41.5 |
| 6.0 | 154.4 | 47.2 |

Example 6

During the curing process the organohydrogensiloxane crosslinking agent reacts with the alkenyl group of the branched olefin. The following tests were carried out with a view to determining whether a crosslinking agent comprising a copolymer of the standard crosslinking agent and the branched olefin mixture would provide similar results to those release coating compositions which comprise the two components individually in the composition.

Three of the copolymer crosslinking agents were prepared using a trimethylsiloxy-terminated polydimethylsiloxane-polymethylhydrogensiloxane copolymer, platinum catalyst, and the branched olefin mixture.

The samples were prepared using the following amounts in parts:

| Copolymer | A' | B' | C' |
| --- | --- | --- | --- |
| crosslinking agent | 55.7 | 68.4 | 89.6 |
| branched olefin mixture | 44.1 | 31.6 | 14.6 |
| Pt catalyst | 0.21 | 0.2 | 0.20 | the co-polymers A', B' and C' were then incorporated in to release coating compositions A", B" and C" as shown below.

A" was 100 g of 100 DP vinyldimethylsiloxy-terminated polydimethylsiloxane polymer, 7.6 g of copolymer A', 1 g of bis(2-methoxy-1-methylethyl) maleate, and 2 g of platinum catalyst.

Compositions B" and C" were the same as A" apart from the fact that they contained 5.4 g of copolymer B' and 4.2 g of copolymer C', respectively.

The release coating compositions A", B" and C" were compared with a composition which solely contained the standard a trimethylsiloxy-terminated polydimethylsiloxane polymethylhydrogensiloxane copolymer crosslinking agent D.

The solventless release coating compositions were applied on to a clay coated paper (Cham Tenero CT-688) using a Euclid® laboratory coater to give a coating of 1 g/m$^2$. Papers coated with the solventless release coating compositions were subsequently placed in an oven at 120° C. for 20 seconds to cure the solventless release coating compositions. The following results were obtained with respect to immediate lamination and 7 days aging the laminate at 23° C. and 50% relative humidity. The tapes used in the lamination were again TESA 7475 and TESA 7476. The results are shown in Table 5 below.

TABLE 5

| Release Composition | 7475 TAPE | 7476 TAPE |
| --- | --- | --- |
| D | 37.5 | 16.3 |
| A" | 41.3 | 37.7 |
| B" | 40.6 | 46.4 |
| C" | 38.1 | 45.5 |

It is evident from the above results that a copolymer of the branched olefin mixture and trimethylsiloxy-terminated polydimethylsiloxane-polymethylhydrogensiloxane copolymer do not provide useful release coating compositions.

Example 7

Oil-in-water based silicone release coating emulsions were prepared for a comparative study of the effects of the branched olefin mixture with 1-octadecene in the release modifier compositions. The results obtained are also compared with an example wherein no release modifier composition was present.

The release modifier emulsions containing the branched olefin mixture will subsequently be referred to as $X^{111}$. The release modifier emulsions containing the 1-octadecene will subsequently be referred to as $Y^{111}$.

Release modifier emulsions $X^{111}$ and $Y^{111}$ were prepared by mixing 35.6 wt % of release modifier composition X and Y respectively, 20 wt % of a 9.5 wt % polyvinylalcohol solution in water with the polyvinylalcohol having a degree of hydrolysis of 96%, 39.9 wt % water, and 4.4 wt % being made up of trimethylsiloxy-terminated polydimethylsiloxane-polymethylhydrogensiloxane copolymer having a viscosity of 85 mm$^2$/s. The crude emulsion was homogenized using an HP sonolator to provide an oil-in-water emulsion. About 0.1 wt % of 3,5-dimethyl-1-hexyn-3-ol was then added to the emulsion.

A base emulsion was prepared by mixing 34.6 wt % of a dimethylvinylsiloxy-terminated polydimethylsiloxane having a viscosity of 450 mPa·s, 3.5 wt % of a dimethylvinylsiloxy-terminated polydimethylsiloxane having a viscosity of 25 mm$^2$/s, and 1.9 wt % of a trimethylsiloxy-terminated polydimethylsiloxane-polymethylhydrogensiloxane copolymer having a viscosity of 85 mm$^2$/s to form an oil phase. The oil phase was blended with 20 wt % of a 9.5 wt % polyvinylalcohol solution in water with the polyvinylalcohol having a degree of hydrolysis of 92%, and 39.9 wt % of water to form a crude emulsion. The crude emulsion was homogenized using an HP sonolator to provide an oil-in-water emulsion. About 0.1 wt % of 3,5-dimethyl-1-hexyn-3-ol was then added to the emulsion.

A catalyst emulsion was prepared by mixing 36.8 wt % of a dimethylvinylsiloxy-terminated polydimethylsiloxane having a viscosity of 450 mPa·s, 3.2 wt % of platinum catalyst, 20 wt % of a 9.5 wt % polyvinylalcohol solution in water with the polyvinylalcohol having a degree of hydrolysis of 92%, 39.95 wt % water, and 0.05 wt % acetic acid to form a crude emulsion. The crude emulsion was homogenized using an HP sonolator to provide an oil-in-water emulsion.

The 3 emulsion parts described above were blended with water in the proportions shown below in order to form silicone release coating emulsions at 10% active solids as test samples. The addition level of the release modifier emulsion is expressed as a percentage of the total emulsion i.e.:(release modifier emulsion/base emulsion+catalyst emulsion+release modifier emulsion)×100. It is to be noted however that in each case release modifier emulsion replaced only base emulsion. The compositions were prepared with no release modifier, or 40%, or 80% of the base emulsion replaced by the relevant release modifier composition. The following test samples were prepared:—(all values given in wt %):

|  | 0% RM | 40% RM | 80% RM |
|---|---|---|---|
| base emulsion | 22.5 | 12.5 | 2.5 |
| Release modifier emulsion | 0 | 10 | 20 |
| platinum catalyst emulsion | 2.5 | 2.5 | 2.5 |
| water | 75.0 | 75.0 | 75.0 |

The emulsion release coating compositions were applied on to glassine paper (Denaeyer Delta PCB) using a Meyer rod to give a coating of 1 g/m². The coated papers were then placed in an oven at 150° C. for 30 seconds to dry and cure the emulsion based release coating composition to a no smear no migration no-rub off condition. Laminates were then prepared and aged in the same manner as previously discussed. Delamination tests were carried out after a variety of different aging periods for low speed release performance at a speed of 0.3 mn/min. Table 6 shows the results of the experiment whereby the coatings containing the release modifier composition $X^{111}$ provide significantly higher results.

In relation to the formulations given it is to be understood that the release modifier emulsion replaces base emulsion in the release coating composition. Hence 0% means that no release modifier composition was present and therefore the base emulsion part of the mixture was at a value of 100%.

Table 6 shows the results of tests where the tapes were laminated to the coated substrates immediately after curing and the laminates were then aged for 20 hours at 23° C. and 50% relative humidity and subsequently were delaminated.

TABLE 6

|  | Immediate lamination + 20 hours aging Release Forces | |
|---|---|---|
| Release Modifier present | tape 7475 [N] | tape 4651 [N] |
| 0 | 0.06 | 0.08 |
| 40% $Y^{111}$ | 0.19 | 0.26 |
| 80% $Y^{111}$ | 1.06 | 0.99 |
| 40% $X^{111}$ | 0.44 | 0.29 |
| 80% $X^{111}$ | 2.98 | 3.20 |

In the following example the above was repeated apart from the fact that the laminates were stored at 23° C. and 50% relative humidity for 1 week prior to delamination. The results are shown in Table 7 below.

TABLE 7

|  | immediate lamination + 7 days aging Release Forces | |
|---|---|---|
| RM Present | tape 7475 [N] | tape 4651 [N] |
| 0 | 0.10 | 0.09 |
| 40% $Y^{111}$ | 0.28 | 0.35 |

TABLE 7-continued

|  | immediate lamination + 7 days aging Release Forces | |
|---|---|---|
| RM Present | tape 7475 [N] | tape 4651 [N] |
| 80% $Y^{111}$ | 1.43 | 1.35 |
| 40% $X^{111}$ | 0.97 | 0.43 |
| 80% $X^{111}$ | 4.99 | 3.83 |

In the following example the above was repeated except for the fact that the coated papers were aged at 23° C. and 50% relative humidity for a week before lamination of the test tapes and the laminates were subsequently stored at 23° C. and 50% relative humidity for 20 hours prior to delamination. The results are shown in Table 8.

TABLE 8

|  | lamination after 1 week + 20 hrs aging release Forces | |
|---|---|---|
| RM Present | tape 7475 [N] | tape 4651 [N] |
| 0 | 0.05 | 0.08 |
| 40% $Y^{111}$ | 0.14 | 0.20 |
| 80% $Y^{111}$ | 0.85 | 1.10 |
| 40% $X^{111}$ | 0.15 | 0.22 |
| 80% $X^{111}$ | 2.16 | 2.69 |

In the following example the above was repeated except for the fact that the coated papers were aged at 23° C. and 50% relative humidity for a week before lamination of with the test tapes and then the laminates were subsequently stored at 23° C. and 50% relative humidity for a further week before delamination. The results are shown in Table 9 below.

TABLE 9

|  | lamination after 1 week + 1 week aging release Forces | |
|---|---|---|
| RM present | tape 7475 [N] | tape 4651 [N] |
| 0 | 0.08 | 0.10 |
| 40% $Y^{111}$ | 0.16 | 0.25 |
| 80% $Y^{111}$ | 1.11 | 1.22 |
| 40% $X^{111}$ | 0.24 | 0.31 |
| 80% $X^{111}$ | 2.64 | 2.83 |

It is to be noted that in every example provided above the $X^{111}$ coatings all gave higher results compared to those coatings containing the $Y^{111}$ release modifier compositions.

Example 8

The following experiment was undertaken to determine what effect the MQ resin has in a release coating composition. In this example the release modifier contained a 1:1 ratio of siloxane resin to vinyldimethylsiloxy-terminated polydimethylsiloxane polymer, no olefins were present in this release modifier composition. The release modifier composition was incorporated into a release coating composition containing 0.12 wt % of bis(2-methoxy-1-methylethyl) maleate, 2 wt % platinum catalyst, a methylhydrogensiloxane crosslinking agent in an amount such that the ratio of silicon-bonded hydrogen atoms to silicon-bonded alkenyl groups in the release coating composition was 1.1:1, and a vinyldimethylsiloxy-terminated polydimethylsiloxane polymer.

The experiments were carried out whereby 0%, 30% and 60% of the release coating composition polymer was replaced by the release modifier composition.

The siloxane resin content of the release modifier was varied by utilizing a siloxane resin A consisting essentially of $Me_3SiO_{1/2}$ (M), $ViMe_2SiO_{1/2}$ (M), and $SiO_{4/2}$ (Q) units, and with 25% and 50% of this resin replaced by a siloxane resin B consisting essentially of $Me_3SiO_{1/2}$ (M) and $SiO_{4/1}$ (Q) units. Table 10 shows the % of siloxane resin B in the release modifier composition. Once the release coating compositions had been prepared the process undertaken to obtain the results in Table 10 was exactly the same as described in Example 3.

TABLE 10

| % wt RM | % Siloxane Resin B in MODIFIER | DELAMINATION SPEED (m/min) | | | | |
|---|---|---|---|---|---|---|
| | | 0.3 | 10.0 | 20.0 | 100.0 | 200.0 |
| | | performance (g/50 mm) | | | | |
| 30 | 0 | 1.2 | 27.3 | 42.4 | 82.1 | 118.7 |
| 30 | 25 | 6.9 | 36.3 | 55.3 | 90.5 | 111.5 |
| 30 | 50 | 2.4 | 49 | 75.4 | 114.7 | 156.1 |
| 60 | 0 | 19.6 | 56.4 | 84.7 | 187.4 | 225.4 |
| 60 | 25 | 41.4 | 86.5 | 155.5 | 238.4 | 261.6 |
| 60 | 50 | 40.6 | 121.9 | 214.4 | 339.5 | 348.5 |

It will be noted that it was found that by incorporating siloxane resins which only contains $Me_3SiO_{1/2}$ units and $SiO_{4/2}$ (Q) units into the release modifier produced improved results over release modifiers containing $Me_3SiO_{1/2}$ (M), $ViMe_2SiO_{1/2}$ (M), and $SiO_{4/2}$ units is incorporated as the sole siloxane resin.

That which is claimed is:

1. A release modifier composition comprising:
   (i) at least one alkenyl functional siloxane; and
   (ii) at least one branched olefin having the formula

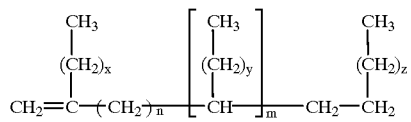

wherein n and m independently have a value of from 0 to 20, x, z and each y is independently have a value of from 1 to 12 with the proviso that the total number of carbon atoms in each olefin is at least 20.

2. A composition according to claim 1, wherein (i) is selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane polymers, and hexenyldimethylsiloxy-terminated polydimethylsiloxane polymers.

3. A composition according to claim 1, wherein (i) is selected from the group consisting of vinyldimethylsiloxy-terminated polydimethylsiloxane polymers and hexenyldimethylsiloxy-terminated polydimethylsiloxane polymers.

4. A composition according to claim 1, wherein (i) is an alkenyl functional siloxane resin consisting essentially of at least one $R^1_3SiO_{1/2}$ (M) unit and at least one $SiO_{4/2}$ (Q) unit wherein $R^1$ is independently selected from the group consisting of alkyl groups, aryl, groups, and alkenyl groups with the proviso that at least one $R^1$ is an alkenyl group and wherein the molar ratio of M units to Q units of from $^{0.6}/_1$ to $^{4}/_1$.

5. A composition according to claim 4, wherein the alkenyl functional siloxane resin selected from the group consisting of siloxane resins consisting essentially of: $ViMe_2SiO_{1/2}$ (M) and $SiO_{4/2}$ (Q) units and siloxane resins consisting essentially of: $Me_3SiO_{1/2}$ (M), $ViMe_2SiO_{1/2}$ (M), and $SiO_{4/2}$ (Q) units, wherein Me denotes methyl, Vi denotes vinyl, and the molar ratio of M to Q units is from $^{0.6}/_1$ to $^{1.9}/_1$.

6. A composition according to claim 1, wherein x, y and z independently have a value of from 5 to 8 and n and/or m independently have a value of from 0 to 8.

7. A composition according to claim 6, wherein n and m=0 or n and m=1.

8. A composition according to claim 1, wherein (ii) is a mixture of

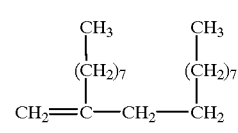

(a)

and

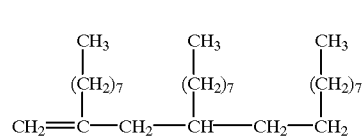

(b)

and the mixture of (a):(b) is in a weight ratio of from 7:3 to 6:4.

9. A composition according to claim 1, wherein the release modifier composition further comprises a siloxane resin consisting essentially of: at least one $R^2_3SiO_{1/2}$ (M) unit and at least one $SiO_{4/2}$ (Q) unit wherein $R^2$ is an alkyl group and the molar ratio of M units to Q units of from $^{0.6}/_1$ to $^{4}/_1$.

10. A composition according to claim 9, wherein the siloxane resin is a siloxane resin consisting essentially of: $Me_3SiO_{1/2}$ (M) and $SiO_{4/2}$ (Q) units wherein Me denotes methyl, and the molar ratio of M to Q units is from $^{0.6}/_1$ to $^{1.9}/_1$.

11. A silicone release coating composition comprising:
   (i) at least one alkenyl functional polyorganosiloxane having at least two silicon-bonded alkenyl groups per molecule;
   (ii) at least one organohydrogensiloxane having at least two silicon-bonded hydrogen groups per molecule;
   (iii) a platinum group metal-containing catalyst; and
   (iv) a release modifier composition comprising:
      (a) at least one alkenyl functional siloxane; and (b) at least one branched olefin having the formula

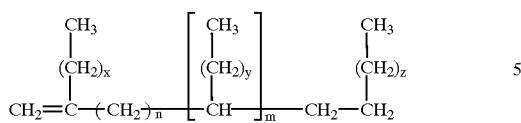

wherein n and m independently have a value of from 0 to 20, x, z and each y is independently have a value of from 1 to 12 with the proviso that the total number of carbon atoms in each olefin is at least 20.

12. A composition according to claim 11, wherein (i) is selected from the group consisting of trimethylsiloxy-terminated polydimethylsiloxane-polymethylvinylsiloxane copolymers, vinyldimethylsiloxy-terminated polydimethylsiloxane-polymethylvinylsiloxane copolymers, trimethylsiloxy-terminated polydimethylsiloxane-polymethylhexenylsiloxane copolymers, hexenyldimethylsiloxy-terminated polydimethylsiloxane-polymethylhexenylsiloxane copolymers, vinyldimethylsiloxy-terminated polydimethylsiloxane polymers, and hexenyldimethylsiloxy-terminated polydimethylsiloxane polymers.

13. A composition according to claim 11, wherein (ii) is selected from the group consisting of dimethylhydrogensiloxy-terminated polydimethylsiloxanes, dimethylhydrogensiloxy-terminated polymethylhydrogensiloxanes, dimethylhydrogensiloxy-terminated polydimethylsiloxane-polymethylhydrogensiloxane copolymers, trimethylsiloxy-terminated polydimethylsiloxane-polymethylhydrogensiloxane copolymers, trimethylsiloxy-terminated polymethylhydrogensiloxanes, $PrSi(OSiMe_2H)_3$, cyclic methylhydrogensiloxanes, siloxane resins consisting essentially of $Me_2HSiO_{1/2}$ units and $SiO_2$ units.

14. A composition according to claim 11, wherein (iii) is selected from the group consisting of chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum black, platinum acetylacetonate, a platinous halide selected from the group consisting of $PtCl_2$, $PtCl_4$, and $Pt(CN)_2$, complexes of platinous halides with an unsaturated compound selected from the group consisting of ethylene, propylene, and organovinylsiloxanes, styrene hexamethyldiplatinum, and $RhCl_3(Bu_2S)_3$.

15. A composition according to claim 11, wherein (iv)(a) is selected from the group consisting of vinyldimethylsiloxy-terminated polydimethylsiloxane polymers and hexenyldimethylsiloxy-terminated polydimethylsiloxane polymers.

16. A composition according to claim 11, wherein x, y and z independently have a value of from 5 to 8 and n and/or m independently have a value of from 0 to 8.

17. A composition according to claim 16, wherein n and m=0 or n and m=1.

18. A composition according to claim 11, wherein (iv)(b) is a mixture of

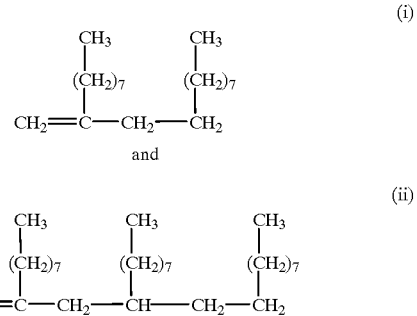

and wherein the mixture of (iv)(b)(i):(iv)(b)(ii) is in a weight ratio of from 7:3 to 6:4.

19. A composition according to claim 11, wherein the composition further comprises at least one surfactant and water.

20. A composition according to claim 19, wherein the surfactant is polyvinylalcohol having a degree of hydrolysis of at least 92%.

21. A composition according to claim 11, wherein the composition further comprises an inhibitor.

22. A composition according to claim 21, wherein the inhibitor is selected from the group consisting of 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, ((1,1-dimethyl-2-propynyl)oxy)trimethylsilane, diallyl maleate, dimethyl maleate, diethyl fumarate, diallyl fumarate, bis(2-methoxy-1-methylethyl) maleate, 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, 3-phenyl-3-butene-1-yne, 1,3,5,7-tetramethyl-1,3,5,7-tetravinylcyclotetrasiloxane, a mixture comprising a conjugated ene-yne and a vinylcyclosiloxane, a mixture comprising a vinylcyclosiloxane and an acetylenic alcohol, and a mixture comprising an unsaturated carboxylic ester and an alcohol.

23. A composition according to claim 19, wherein the composition further comprises an inhibitor.

24. A composition according to claim 23, wherein the inhibitor is selected from the group consisting of 1-ethynyl-1-cyclohexanol, 2-methyl-3-butyn-2-ol, 2-phenyl-3-butyn-2-ol, 2-ethynyl-isopropanol, 2-ethynyl-butane-2-ol, and 3,5-dimethyl-1-hexyn-3-ol, trimethyl(3,5-dimethyl-1-hexyn-3-oxy)silane, dimethyl-bis-(3-methyl-1-butyn-oxy)silane, methylvinylbis(3-methyl-1-butyn-3-oxy)silane, ((1,1-dimethyl-2-propynyl)oxy)trimethylsilane, diallyl maleate, dimethyl maleate, diethyl fumarate, diallyl fumarate, bis(2-methoxy-1-methylethyl) maleate, 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, 3-phenyl-3-butene-1-yne, 1,3,5,7-tetramethyl-1,3,5,7-tetravinylcyclotetrasiloxane, a mixture comprising a conjugated ene-yne and a vinylcyclosiloxane, a mixture comprising a vinylcyclosiloxane and an acetylenic alcohol, and a mixture comprising an unsaturated carboxylic ester and an alcohol.

25. A method of making a silicone release coating composition comprising reacting a mixture comprising:
(i) at least one alkenyl functional polyorganosiloxane having at least two silicon-bonded alkenyl groups per molecule;

(ii) at least one organohydrogensiloxane having at least two silicon-bonded hydrogen groups per molecule;
(iii) a platinum group metal-containing catalyst; and
(iv) a release modifier composition comprising:
 (a) at least one alkenyl functional siloxane; and
 (b) at least one branched olefin having the formula

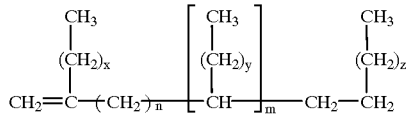

wherein n and m independently have a value of from 0 to 20, x, z and each y is independently have a value of from 1 to 12 with the proviso that the total number of carbon atoms in each olefin is at least 20.

26. A method according to claim 25, wherein the mixture further comprises at least one surfactant and water.

27. A method according to claim 25, wherein the mixture further comprises an inhibitor.

28. A method according to claim 26, wherein the mixture further comprises an inhibitor.

29. A method of making an article of manufacture comprising:
(I) applying a silicone release coating composition to the surface of a substrate wherein the silicone release coating composition comprises:
 (i) at least one alkenyl functional polyorganosiloxane having at least two silicon-bonded alkenyl groups per molecule;
 (ii) at least one organohydrogensiloxane having at least two silicon-bonded hydrogen groups per molecule;
 (iii) a platinum group metal-containing catalyst; and
 (iv) a release modifier composition comprising
  (a) an alkenyl functional siloxane; and
  (b) at least one branched olefin having the formula

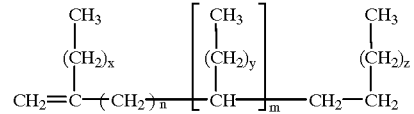

wherein n and m independently have a value of from 0 to 20, x, z and each y is independently have a value of from 1 to 12 with the proviso that the total number of carbon atoms in each olefin is at least 20.

30. A method according to claim 29, wherein the method further comprises:
(II) exposing the product of (I) to heat in an amount sufficient to cure the silicone release coating composition.

31. A method according to claim 30, wherein the method further comprises
(III) applying an adhesive to the product of (II).

* * * * *